United States Patent
Kishimoto

(10) Patent No.: US 7,461,252 B2
(45) Date of Patent: Dec. 2, 2008

(54) AUTHENTICATION METHOD, PROGRAM FOR IMPLEMENTING THE METHOD, AND STORAGE MEDIUM STORING THE PROGRAM

(75) Inventor: Hiroaki Kishimoto, Warabi (JP)

(73) Assignee: Canon Kabushiki Kaisha (JP)

( * ) Notice: Subject to any disclaimer, the term of this patent is extended or adjusted under 35 U.S.C. 154(b) by 814 days.

(21) Appl. No.: 11/017,146

(22) Filed: Dec. 20, 2004

(65) Prior Publication Data

US 2005/0144446 A1 Jun. 30, 2005

(30) Foreign Application Priority Data

Dec. 25, 2003 (JP) ............................. 2003-430972

(51) Int. Cl.
 *H04L 9/00* (2006.01)
 *H04L 9/32* (2006.01)
(52) U.S. Cl. ............................ 713/168; 713/189; 726/2
(58) Field of Classification Search ......... 713/168–171, 713/189, 193; 726/2, 16–21, 27–33
 See application file for complete search history.

(56) References Cited

U.S. PATENT DOCUMENTS 6,371,377 B2 * 4/2002 Asoh et al. .................. 235/487

2004/0199784 A1 10/2004 Irisawa et al.

FOREIGN PATENT DOCUMENTS

| JP | 2002-073196 A | 3/2002 |
| JP | 2002-133384 A | 5/2002 |
| JP | 2002-298097 | 10/2002 |
| JP | 2003-162698 A | 6/2003 |

* cited by examiner

*Primary Examiner*—Hosuk Song
(74) *Attorney, Agent, or Firm*—Rossi, Kimms & McDowell, LLP

(57) ABSTRACT

A authentication method which can provide a card application that does not depend on the presence of an authentication information comparison system and can also improve security and simplify authentication information management. An authentication system to which the authentication method is applied is comprised of an IC card 200 having a card application 210 and a card application 220, and a terminal device 100 that can communicate with the IC card 200. The card application 210 compares authentication information inputted by a user and transmitted from the terminal device and authentication information held by itself. The card application 210 stores authentication status information according to results of the comparison. The card application 220 acquires the authentication status information from the card application 210, stored in the IC card 200.

9 Claims, 10 Drawing Sheets

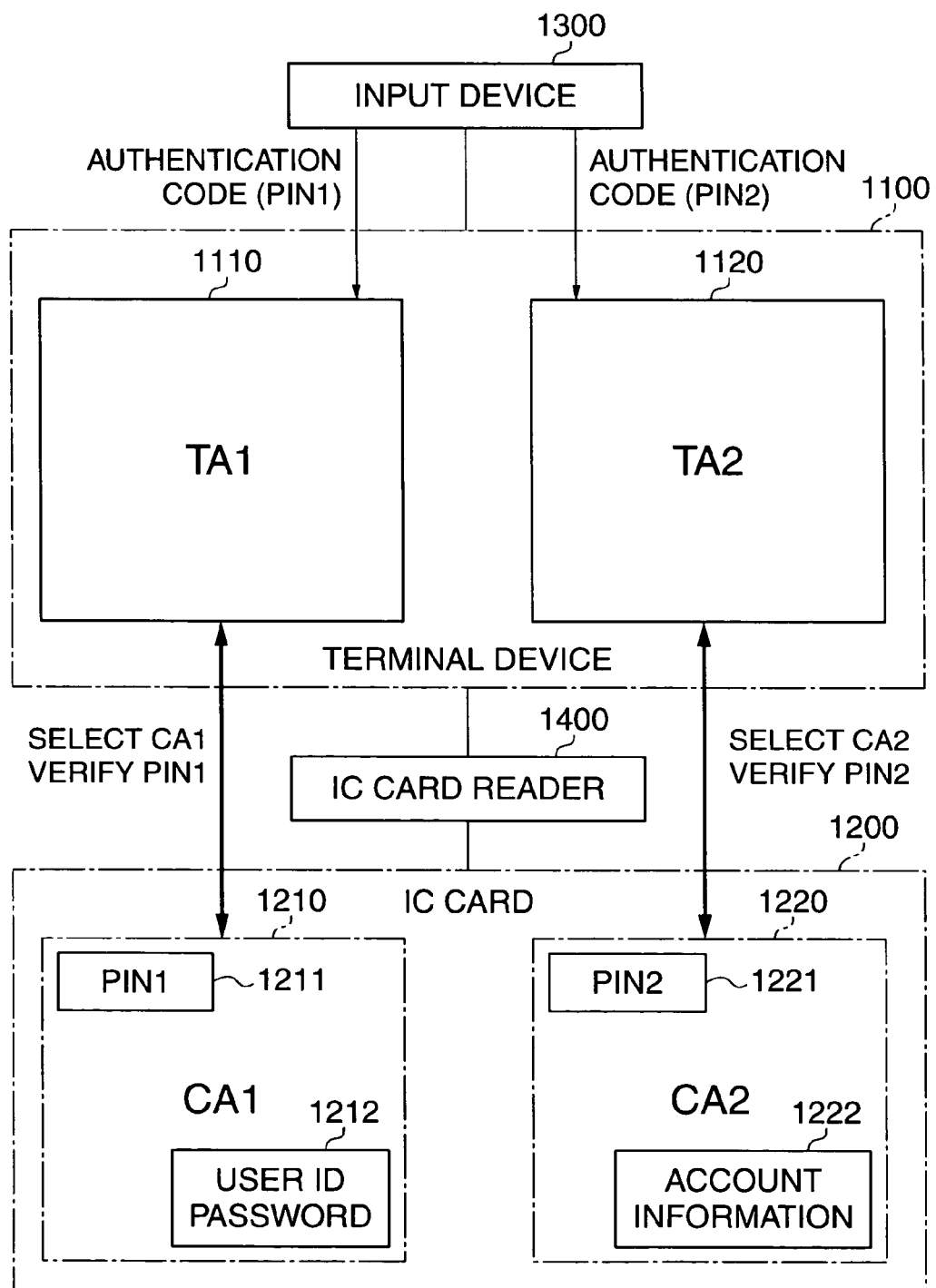

AUTHENTICATION METHOD, PROGRAM FOR IMPLEMENTING THE METHOD, AND STORAGE MEDIUM STORING THE PROGRAM

BACKGROUND OF THE INVENTION

1. Field of the Invention

The present invention relates to an authentication method, a program for implementing the method, and a storage medium storing the program, and more particularly, to an authentication method that carries out personal identification required when using applications in an IC card storing a plurality of applications, and a program for implementing the method, and a storage medium storing the program.

2. Description of the Related Art

In recent years, a device for personal identification generally called an IC card has come into increasing use as a device for carrying out authentication in a variety of situations, from using in-company information devices and entering/exiting facilities to using services in financial, information communications and medical fields as well as services on the Internet. Information needed to use these services can be installed in the IC card.

Further, in addition to the ability to store information needed to use a variety of services on the IC card, more advanced and more complex processing, such as encryption and addition/subtraction of account information, have come to be required of the IC card, and for these applications an IC card called a multi-application card is used. The multi-application card not only stores information adapted to multiple services but can also accommodate a plurality of card applications having a variety of capabilities. Java Card (registered trademark of Sun Microsystems, Inc.) and MULTOS (Multi-application Operating System) are such multi-application cards that have come to be widely used.

Usually, in a system that uses an IC card, when a user accesses the IC card, the user inputs authentication information such as an authentication code (PIN) or a fingerprint through a user interface provided by a terminal application installed in a terminal device to carry out authentication for that IC card. Here, in order to further an understanding of the usual authentication procedure where a multi-application card is used, a description will be given of an authentication system using a multi-application card shown in FIG. 15 as an example.

FIG. 15 is a block diagram schematically showing the construction of the conventional authentication system.

As shown in FIG. 15, an IC card 1200 has stored thereon a card application (CA1) 1210 and a card application (CA2) 1220, with each card application provided with authentication information in the form of a PIN1 1211 and a PIN2, 1221. Moreover, the card application (CA1) 1210 is provided with a user ID password 1212 and the card application (CA2) 1220 is provided with accounting information 1222. It should be noted that, for simplification, although the card application (CA1) 1210 and the card application (CA2) 1220 are both given PINs as authentication information, alternatively, fingerprint or other information may be used as the authentication information.

A terminal device 1100 has installed therein a terminal application (TA1) 1110 and a terminal application (TA2) 1120 for accessing the card application (CA1) 1210 and the card application (CA2) 1220, respectively. The terminal device 1100 is equipped with an input device 1300 for inputting a PIN and an IC card reader 1400 for scanning the IC card 1200.

When the user uses the terminal application (TA1) 1110, the user enters a PIN from the input device 1300 through a user interface provided by the terminal application (TA1) 1110. Then, the terminal application (TA1) 1110 selects the card application (CA1) 1210 on the IC card 1200 (SELECT) and verifies the card application (CA1) 1210 using the entered PIN (VERIFY PIN 1). The card application (CA1) 1210 provides the results of checking the PIN (whether verification has succeeded or failed) to the terminal application (TA1) 1110. When using the user terminal application (TA2) 1120, the user carries out verification of the card application (CA2) 1220 in the same way (VERIFY PIN 2) as described above.

On the other hand, another conventional technology has been proposed that concentrates the comparison function of comparing between card application authentication information and user input authentication information either in a shared module in the IC card or in a shared module of the terminal (see Japanese Laid-Open Patent Publication (Kokai) No. 2002-298097, for example).

However, when carrying out authentication using the method shown in the conventional technique in FIG. 15, the user must carry out the authentication process each time the user needs to switch terminal applications and/or card applications, and each of the card applications must maintain authentication information as well as the ability to compare that authentication information with the user input authentication information. Accordingly, there is much unnecessary processing where it is desired that the authentication information be set so as to be shared between card applications. Moreover, the user also must select separate authentication information for the card applications, thus complicating authentication information management.

For example, in the conventional technique shown in FIG. 15, when the user uses the terminal device 1100, the user enters a PIN for the terminal application (TA1) 1110, and obtains permission to use the terminal device 1100 as a result of the authentication for the card application (CA1) 1210 being successful. However, in the event that the user must then use the terminal application (TA2) 1120 and scan or change the information in the card application (CA2) 1220, the user has to carry out another authentication for the card application (CA2) 1220 in addition to the authentication for the card application (CA1) 1210.

In particular, although the functions of the card application (CA1) 1210 and of the card application (CA2) 1220 are independent, where it is assumed that these functions are to be used only on the same terminal device 1100 and operate in tandem, the absurdity of carrying out a separate authentication procedure for each card application becomes significant.

One method of solving the foregoing problem involves concentrating the functions of comparing the card application authentication information and the user input authentication information either in a shared module on the IC card or in a shared module of the terminal, as disclosed by the aforementioned Japanese Laid-Open Patent Publication (Kokai) No. 2002-298097.

However, because the user input authentication information is once received by one of the card applications to be used and delivered to the shared module in the IC card, the other card application which, when used, in actuality, does not need to receive the authentication information but only needs to confirm the authentication status for the one card application must still carry out the unnecessary process of directly receiving the authentication information and delivering that authentication information to the shared module. Moreover, causing a card application that does not require direct receipt of authentication information to receive the authentication information is undesirable from a security standpoint as well.

Furthermore, for example, where it is subsequently desired to switch the method of checking the authentication information from the checking of character information such as a PIN that the user inputs using a keyboard or the like to the checking of biometric information such as a fingerprint, since all the modules that carry out authentication information reception and authentication information checking must be changed, that is, not only the shared module but also the card applications that receive the authentication information must necessarily be changed.

SUMMARY OF THE INVENTION

It is an object of the present invention to provide an authentication method which can provide a card application that does not depend on the presence of an authentication information comparison system and can also improve security and simplify authentication information management, and a program for implementing the method, and a storage medium storing the program.

To attain the above object, in a first aspect of the present invention, there is provided an authentication method for an authentication system including an information recording medium in which a plurality of applications including an authentication application holding authentication information are stored, and at least one terminal device that can communicate with the information recording medium, comprising a comparison step of comparing authentication information inputted by a user and transmitted from the terminal device and the held authentication information, by the authentication application, a storage step of storing authentication status information according to results of the comparison, by the authentication application, and an acquisition step of acquiring the authentication status information from the authentication application, by at lease one application other than the authentication application, stored in the information recording medium.

Preferably, the authentication application and the other application establish a trust relationship therebetween by recognizing identification information for the other.

Alternatively, the authentication application and the other application establish a trust relationship therebetween by carrying out authentication of each other using an encryption key held by each.

Preferably, the terminal device has a plurality of terminal applications associated respectively with the plurality of applications stored in the information recording medium for communication therewith.

More preferably, the authentication method comprises a notification step of notifying the terminal application associated with the other application stored in the information recording medium that the authentication status information acquired from the authentication application indicates non-authentication when the acquired authentication status indicates the non-authentication, and a request step of requesting the terminal application associated with the authentication application to carry out user authentication, by the terminal application associated with the other application, in response to the notification.

Also preferably, the authentication method comprises a transmission step of transmitting access information relating to at least one accessible application stored in the information recording medium to the terminal application associated with the authentication application, based on the authentication status information, by the authentication application, a second storage step of storing the transmitted access information by the terminal application associated with the authentication application, and a delivery step of delivering the access information from the terminal application associated with the authentication application to the terminal application associated with the other application stored in the information recording medium when the terminal application associated with the other application is accessible.

More preferably, the authentication method comprises a second transmission step of transmitting the delivered access information from the terminal application associated with the other application stored in the information recording medium to the other application, before-access to the other application stored in the information recording medium is carried out, and a determination step of determining, by the other application stored in the information recording medium, whether access to itself can be carried out, based on the access information.

Also preferably, the authentication method comprises an encryption step of encrypting, using an encryption key, access information relating to at least one accessible application stored in the information recording medium to the terminal application associated with the authentication application, based on the authentication status information, by the authentication application, and a decryption step of decrypting the encrypted access information in response to a request from the other application stored in the information recording medium.

Preferably, the authentication status information is erased when a connection between the information recording medium and the terminal device.

Preferably, the access information is erased when a connection between the information recording medium and the terminal device.

To attain the above object, in a second aspect of the present invention, there is provided a program for causing a computer to execute an authentication method for an authentication system including an information recording medium in which a plurality of applications including an authentication application holding authentication information are stored, and at least one terminal device that can communicate with the information recording medium, comprising a comparison module for comparing authentication information inputted by a user and transmitted from the terminal device and the held authentication information, by the authentication application, a storage module for storing authentication status information according to results of the comparison, by the authentication application, and an acquisition module for acquiring the authentication status information from the authentication application, by at lease one application other than the authentication application, stored in the information recording medium.

To attain the above object, in a third aspect of the present invention, there is provided a storage medium storing a program for causing a computer to execute an authentication method for an authentication system including an information recording medium in which a plurality of applications including an authentication application holding authentication information are stored, and at least one terminal device that can communicate with the information recording medium, the program comprising a comparison module for comparing authentication information inputted by a user and transmitted from the terminal device and the held authentication information, by the authentication application, a storage module for storing authentication status information according to results of the comparison, by the authentication application, and an acquisition module for acquiring the authentication status information from the authentication application, by at lease one application other than the authentication application, stored in the information recording medium.

The above and other objects, features, and advantages of the invention will become more apparent from the following detailed description taken in conjunction with the accompanying drawings.

BRIEF DESCRIPTION OF THE DRAWINGS

FIG. 15 is a block diagram schematically showing the construction of a conventional authentication system.

DETAILED DESCRIPTION OF THE PREFERRED EMBODIMENTS

The present invention will now be described in detail below with reference to the drawings showing preferred embodiments thereof.

Figure 1:
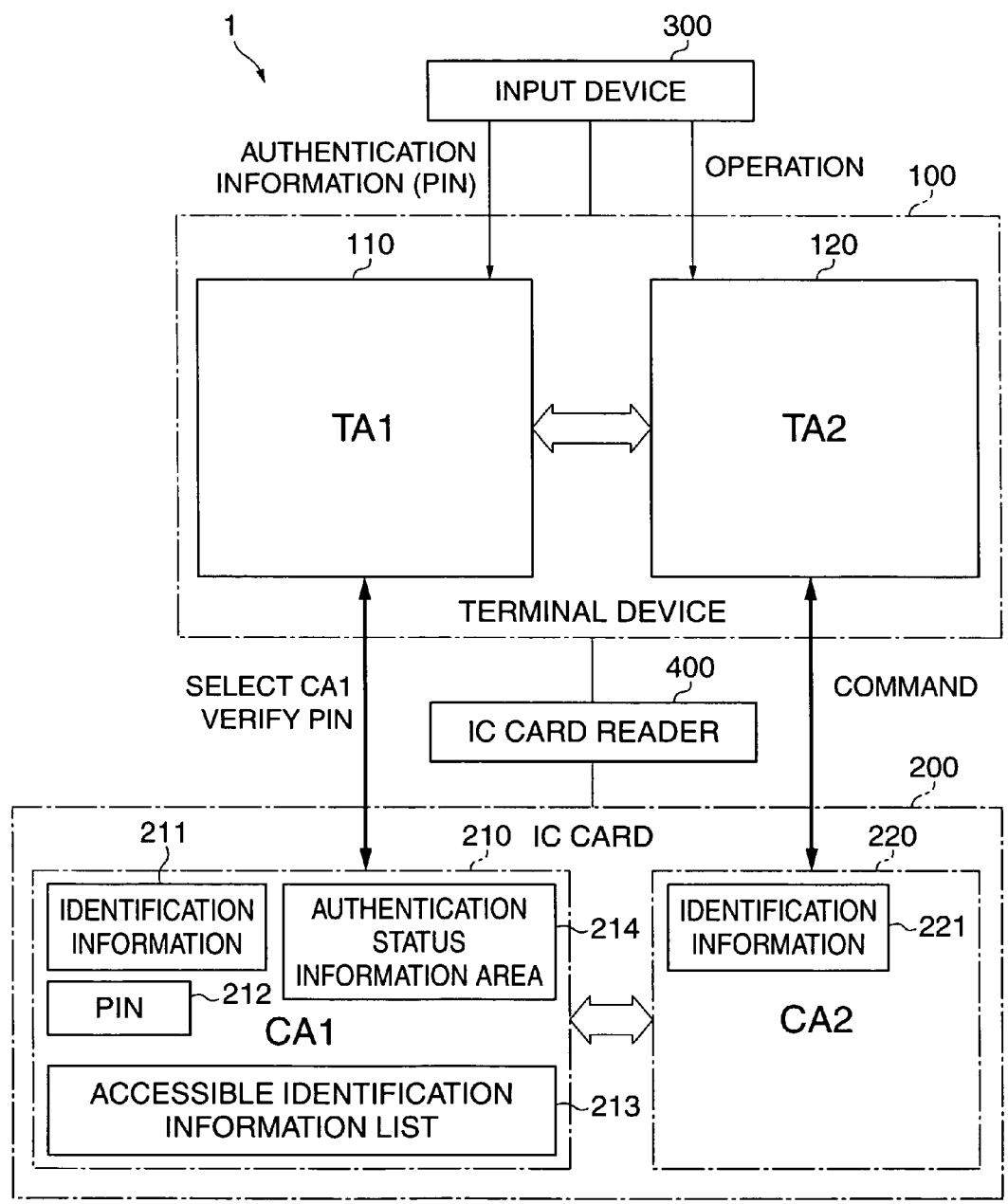
FIG. 1 is a block diagram schematically showing the construction of an authentication system to which is applied an authentication method according to a first embodiment of the present invention.

FIG. 1 is a block diagram schematically showing the construction of an authentication system to which is applied an authentication method according to a first embodiment of the present invention.

As shown in FIG. 1, the authentication system 1 is comprised of a terminal device 100 having a terminal application (TA1) 110 and a terminal application (TA2) 120, an IC card 200 (storage medium) having a card application (CA1) 210 (authentication application, comparison device) and a card application (CA2) 220 (other applications, acquisition device), an input device 300, and an IC card reader 400.

The terminal device 100 is equipped with the input device 300 for inputting a PIN as user authentication information and the IC card reader 400 for scanning the IC card 200. The input device 300 can also be used to operate the terminal application 110 and the terminal application 120 on the terminal device 100. When the user uses the terminal device 100, the user sets the IC card 200 in the IC card reader 400.

It should be noted that, in FIG. 1, for simplicity of explanation, an example is used of an input device 300 provided as a device of inputting the authentication information to the IC card 200. However, alternatively a biometric authentication device that inputs a fingerprint or a voiceprint may be used as a means for inputting the authentication information, instead of the input device.

A card application 210 and a card application 220 associated with the terminal application 110 and the terminal application 120, respectively, are stored in the user's IC card 200. The terminal application 110 sends and receives commands and data via the IC card reader 400 to and from the card application 210, and the terminal application (TA1) 120 sends and receives commands and data via the IC card reader 400 to and from the card application 220, respectively.

It should be noted that, in FIG. 1, for simplicity of explanation, an example is given of two card applications 210, 220 being stored in the IC card 200. However, other applications may be installed in the IC card 200. Moreover, when sending and receiving commands and data to and from the respective corresponding card applications 210, 220, the terminal application 110, 120 may carry out confidential communications using a previously determined encryption algorithm or encryption key as a means for guaranteeing that communications are carried out with the correct counterparts.

The card application 210 and the card application 220 are provided with identification information 211 and identification information 221, respectively. With the identification information 211, 221, the card applications 210, 220 stored in the IC card 200 can be uniquely identified at least in the IC card 200. Moreover, an accessible identification information list 213 containing a list of identification information of card applications that may also be activated (i.e., access granted) when authentication of the card application 210 is carried out is stored in the card application 210.

The contents of the identification information list 213 can be set when the card application 220 is installed in the IC card 200, and can be set such that the card application 210 and the card application 220 can be mutually relied upon. By so doing, the card application 210 and the card application 220 can be mutually accessible to each other through a predetermined interface.

It should be noted that the trust relationship between the card application 210 and the card application 220 may be such that each application knows the other's identification information, or each application has a built-in encryption key (common key or a public key) and mutual authentication is carried out using the encryption key when accessing through the above-described predetermined interface.

Moreover, a PIN 212 that is the user authentication information code is stored in the card application 210 and no PIN is stored in the card application 220. The card application 220, based on the above-described trust relationship, consigns the user's card application 220 authentication to the card application 210, and authentication for the card application 210 is authentication for the card application 220 as well. Furthermore, the card application 210 is provided with an authentication status information area 214 (storage device) that stores the user authentication information status.

Next, the operation of the authentication system 1 will be described with reference to FIGS. 1 to 10.

Figure 2:
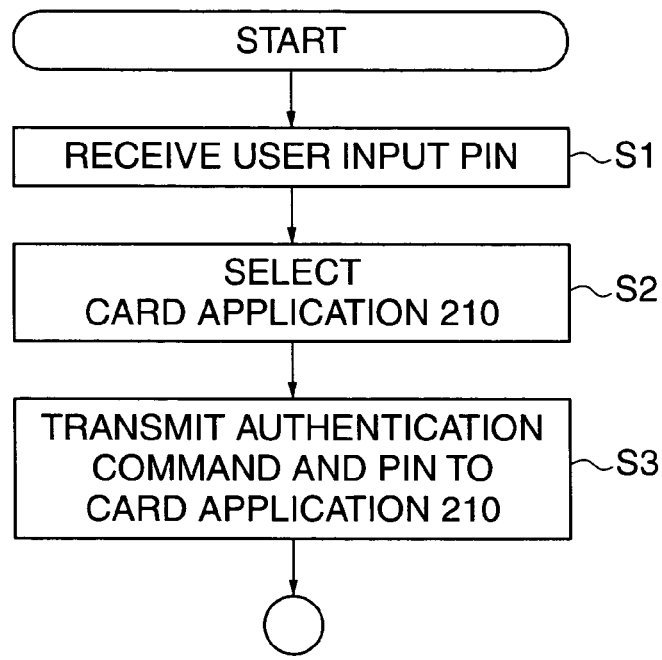
FIG. 2 is a flow chart showing the procedure of a process executed by a terminal application 110 of the authentication system in FIG. 1.

First, an authentication process executed by the authentication system 1 will be described. FIG. 2 is a flow chart showing the procedure of a process executed by the terminal application 110 of the authentication system 1 in FIG. 1, and FIG. 3 is a flow chart showing the procedure of a process executed by the card application 210.

As shown in FIG. 2, first, the terminal application 110, after receiving a PIN input by the user from the input device 300 (step S1), selects the card application 210 (step S2) and transmits the PIN together with an authentication command to the card application 210 (step S3).

Figure 3:
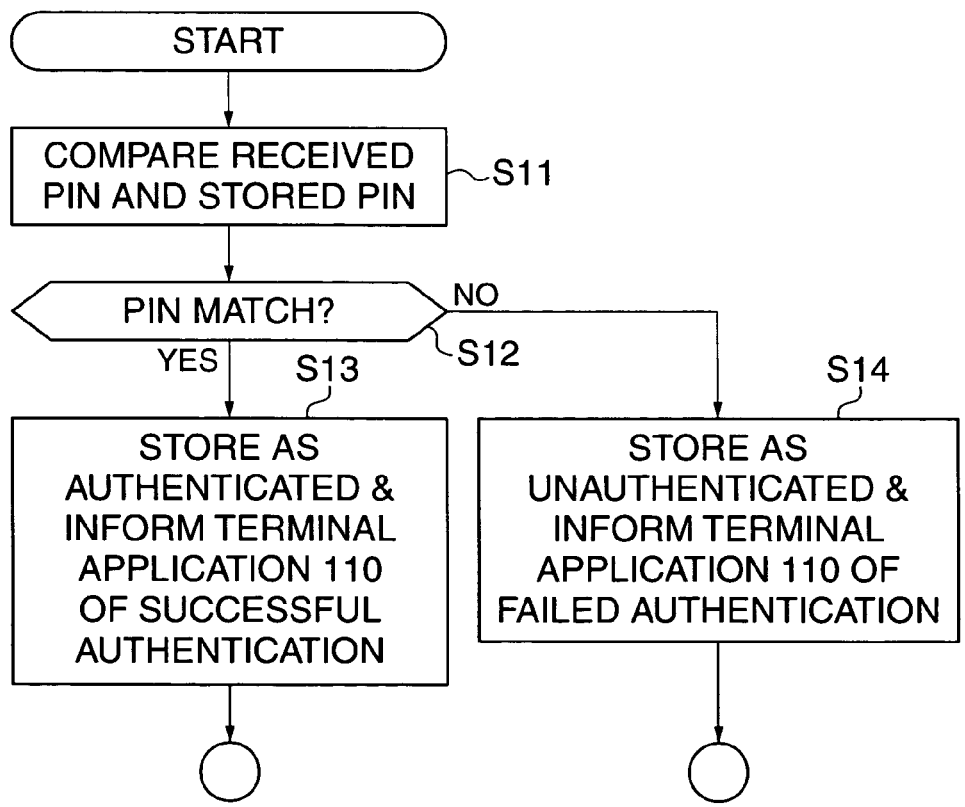
FIG. 3 is a flow chart showing the procedure of a process executed by a card application 210 of the authentication system.
Figure 4:
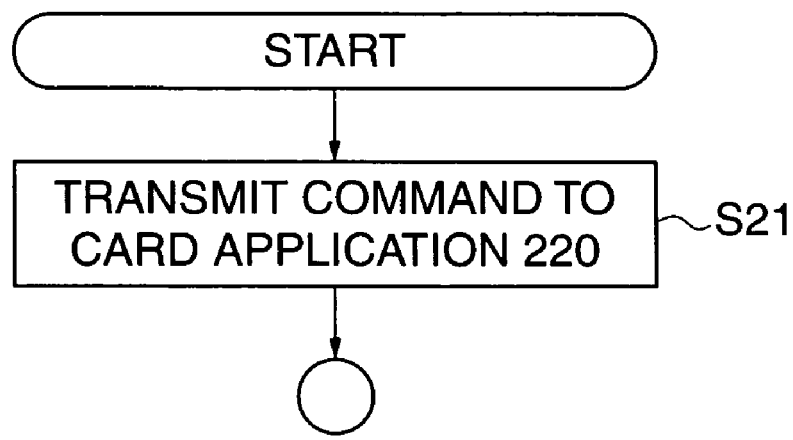
FIG. 4 is a flow chart showing the procedure of a process executed by a terminal application 220 of the authentication system.
Figure 5:
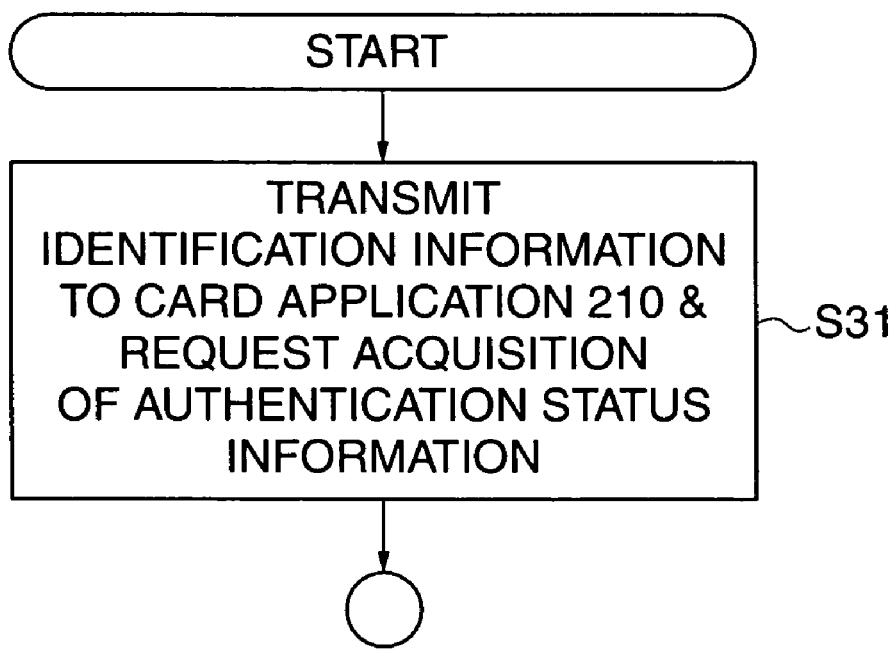
FIG. 5 is a flow chart showing the procedure of a process executed by the card application.
Figure 6:
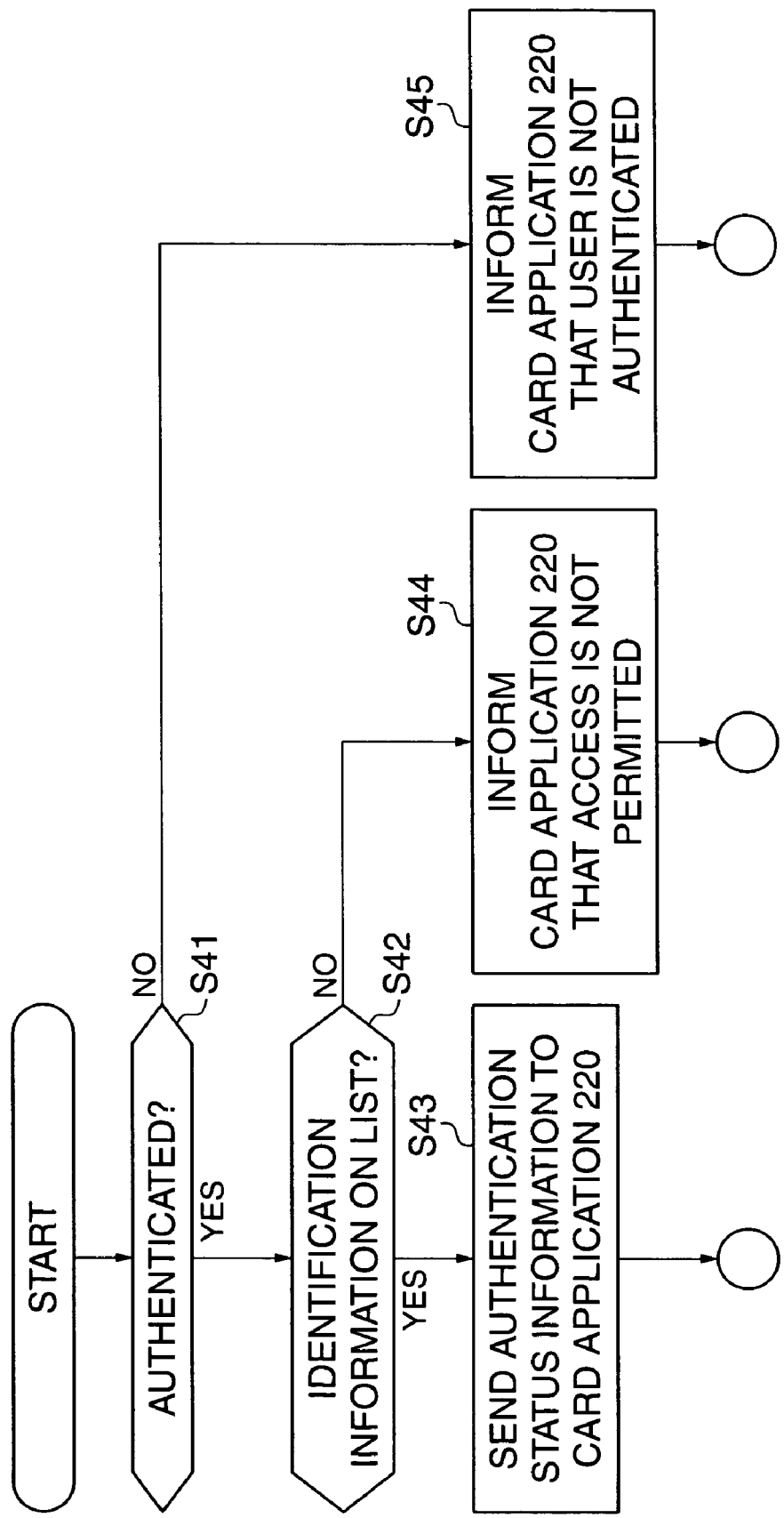
FIG. 6 is a flow chart showing the procedure of a process executed by the card application 210.
Figure 7:
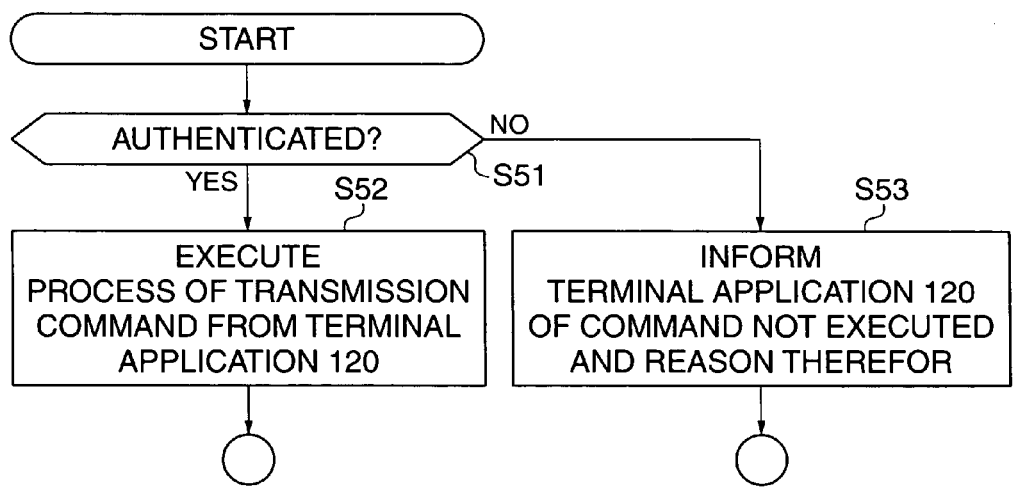
FIG. 7 is a flow chart showing the procedure of a process executed by the card application 220.
Figure 8:
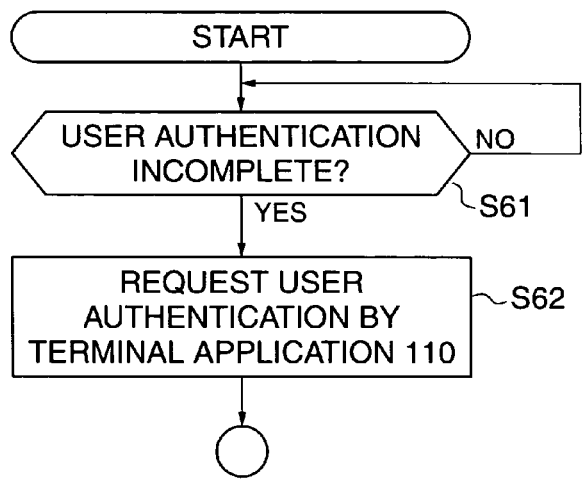
FIG. 8 is a flow chart showing the procedure of a process executed by the terminal application 120.
Figure 9:
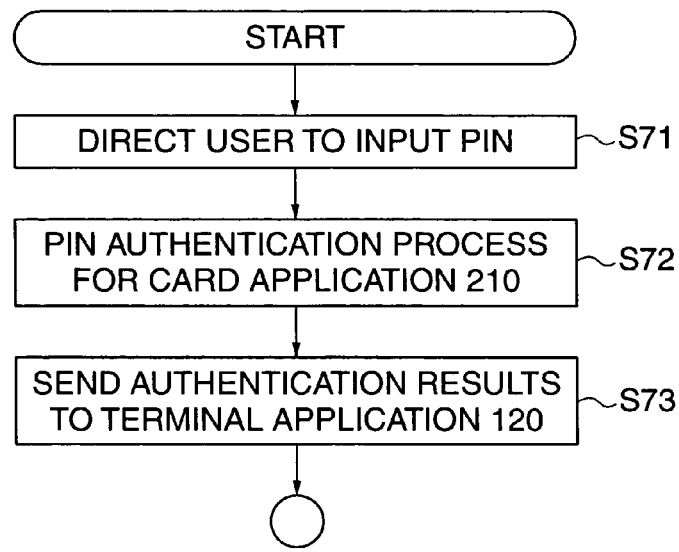
FIG. 9 is a flow chart showing the procedure of a process executed by the terminal application 110.
Figure 10:
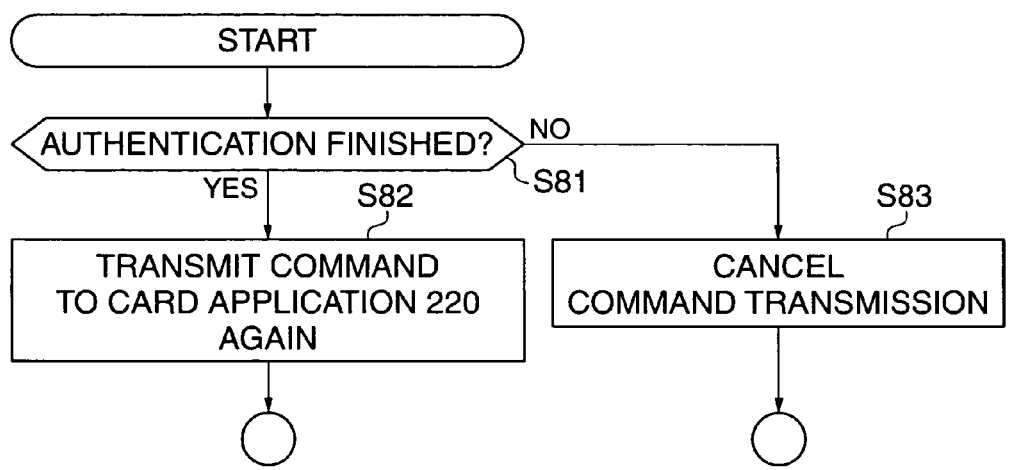
FIG. 10 is a flow chart showing the procedure of a process executed by the terminal application 120.

As shown in FIG. 3, the card application 210 compares the PIN received from the terminal application 110 and the PIN 212 stored in the card application 210 (step S1). If the results of the comparison indicate that the two PINs match (YES to a step S12), then the card application 210 stores the user authentication status in the authentication status information area 214 as authenticated, and returns to the terminal application 110 a message to the effect that the user input PIN has been properly authenticated (step S13), and then the present process is terminated.

If the results of the comparison indicate that the two PINs do not match (NO to the step S12), then the card application 210 stores the user authentication status in the user authentication status information area 214 as unauthenticated and returns to the terminal application 110 a message to the effect that the user PIN has not been authenticated, and processing is repeated from the step S1.

Next, a description will be given of a command execution process executed by the authentication system 1. FIGS. 4 to 10 are flow charts showing the procedure of processes executed by the terminal applications 110, 120, and the card applications 210, 220.

First, the terminal application 120, after receiving a user input command execution request from the input device 300 (step S20), transmits the command for which execution is requested to the card application 220 (step S21).

Then, in order to detect whether the authentication for the card application 210 is completed, the card application 220 transmits its own identification information 221 to the card application 210 through an interface with the card application 210 and requests the card application 210 to obtain card application 210 authentication status information (step S31).

If authentication of the user is completed (YES to a step S41), then the card application 210, having received the request to obtain the authentication status information, determines whether or not the identification information on the card application 220 is present in the accessible identification information list 213 containing a list of card applications to which access is permitted when authentication is completed (step S42).

If the identification information on the card application 220 is present in the identification information list 213 (YES to the step S42), then the card application 210 sends authentication status information indicating that the authentication is completed to the card application 220 (step S43). If the identification information on the card application 220 is not present in the identification information list 213 (NO to the step S42), then the card application 210 informs the card application 220 that access is not permitted, without sending authentication status information to the card application 220 (step S44).

Moreover, if the user is not yet authenticated (NO to the step S41), the card application 210 informs the card application 220 that the user is not yet authenticated (step S45).

Next, if the card application 220 receives the authentication status information from the card application 210 in the step S43 and the authentication is found to be completed (YES to a step S51), then the card application 220 executes the process according to the command transmitted from the terminal application 120 in the step S21 (step S52), and then the present process is terminated.

By contrast, if the card application 220 has been informed by the card application 210 in the step S44 that access is not permitted or that the user is not yet authenticated and authentication is thus found to be incomplete (NO to the step S51), then the card application 220 informs the terminal application 120 that the command was not executed, without executing the process based on the command transmitted from the terminal application 120, and provides the terminal application 120 with information indicating the reason why the command was not executed (step S53).

Next, when, after receiving the information indicating that the command was not executed from the card application 220, the terminal application 120 determines that the reason is that user authentication is incomplete for the card application 210 (YES to a step S61), the terminal application 120 requests the terminal application 110 to carry out user authentication (step S62).

The terminal application 110, having received the aforementioned request, prompts the user to input a PIN (step S71), using a visual display on a display unit, not shown, of the terminal device 100, or an audio message output from an audio output unit, not shown, of the terminal device 100, causes the card application 210 to carry out PIN authentication using the authentication process shown in FIGS. 2 and 3 described above (step S72), and sends the results of the authentication to the terminal application 120 (step S73).

Then, the terminal application 120 refers to the results of authentication received from the terminal application 110, and if the authentication is completed (YES to a step S81), the terminal application 120 transmits the command again to the card application 220 (step S82), whereas, if the authentication is incomplete, the terminal application 120 stops transmission of the command to the card application 220 (step S83), and then the present process is terminated.

It should be noted that the authentication status information generated in the present embodiment is held as long as the connection between the terminal device 100 and the IC card 200 is maintained, and is erased if such connection is broken.

As described above, according to the present process, authentication information is stored only in the card application 210, and the card application 220, which does not have the authentication information and the authentication information comparison system, can consign the authentication for the card application 220 using the terminal application 120 to the card application 210, and can thus share user authentication status with the card application 210. Thus, an authentication system using card application that does not depend on the presence of an authentication information comparison system can be provided, whereby it is possible to eliminate the unnecessary process of directly receiving and delivering authentication information by the card application that does not require direct reception of such authentication information.

Moreover, by sharing only the user authentication status between the card applications as described above, the user no longer needs to carry out authentication of the IC card each time the user switches card applications, and further, the use of single authentication information improves security and simplifies authentication information management.

Next, a description will be given of a second embodiment of the present invention.

Figure 11:
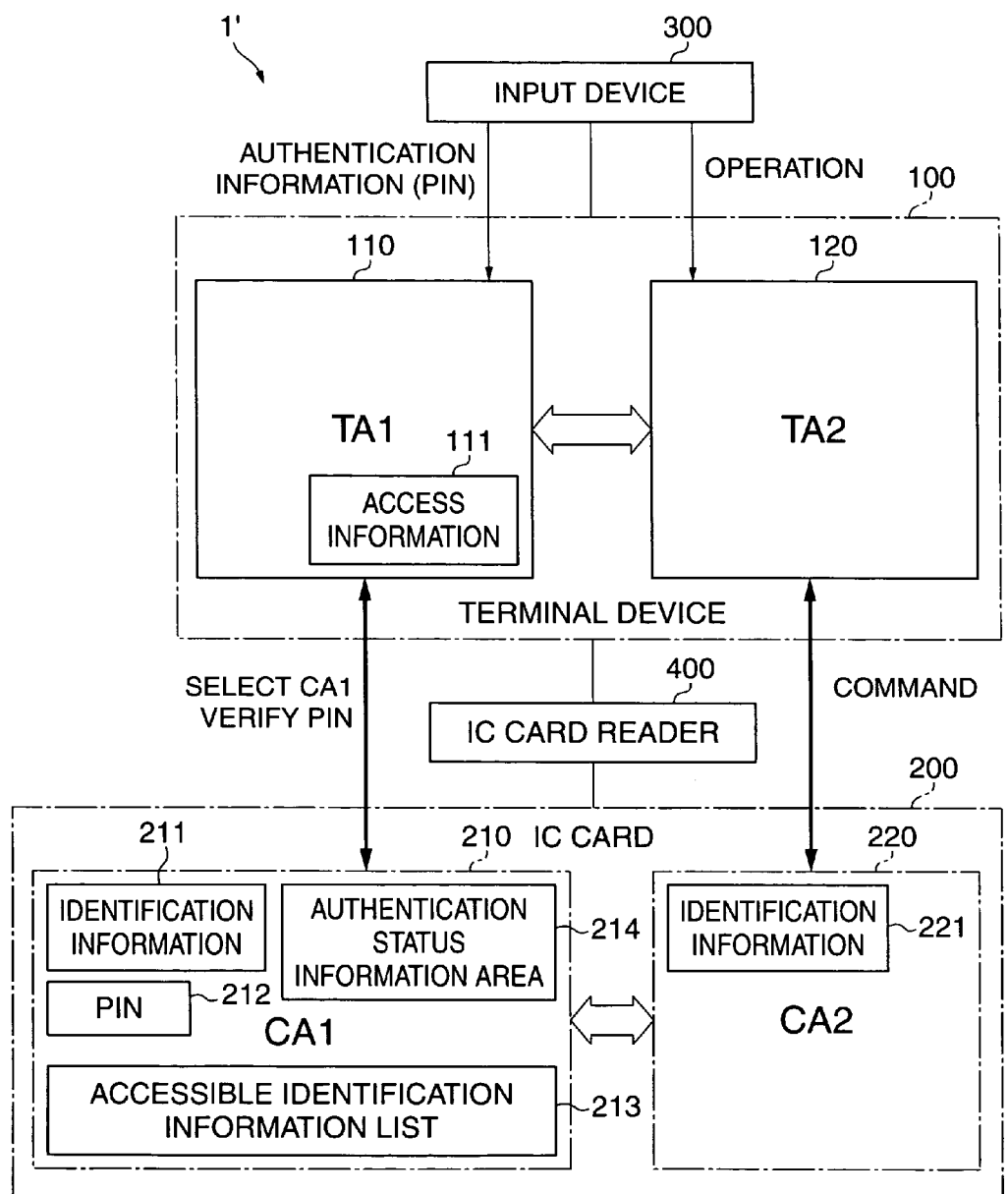
FIG. 11 is a block diagram schematically showing the construction of an authentication system to which is applied an authentication method according to a second embodiment of the present invention.

FIG. 11 is a block diagram schematically showing the construction of an authentication system 1' to which is applied an authentication method according to the second embodiment.

As shown in FIG. 11, the present embodiment differs from the first embodiment described above in that the terminal application 110 has access information 111. The other elements of the authentication system 1' are the same as the authentication system 1 in FIG. 1, and the elements shown in FIG. 11 that correspond to the elements shown in FIG. 1 are designated by the same reference numerals and description thereof is omitted.

Next, a description will be given of the operation of the authentication system 1'.

Figure 12:
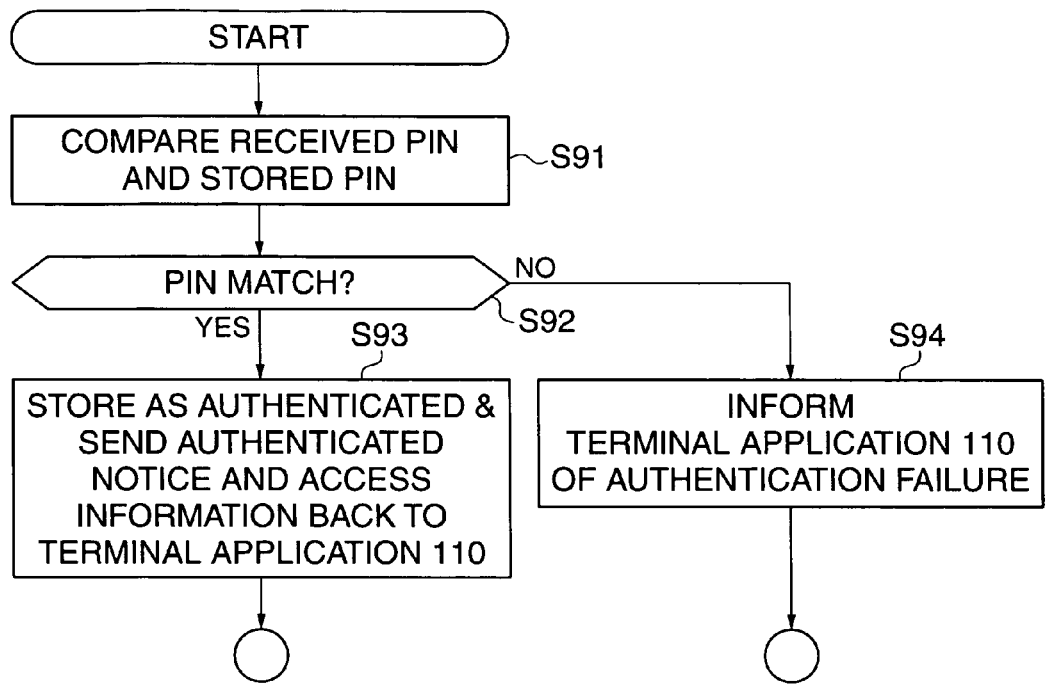
FIG. 12 is a flow chart showing the procedure of a process executed by a card application 210 of the authentication system in FIG. 6.

First, an authentication process executed by the authentication system 1' will be described. FIG. 12 is a flow chart showing the procedure of an authentication process executed by the authentication system 1'.

As shown in FIG. 12, first, when the user uses the terminal application 110, the same process as the authentication process shown in FIG. 2 described above is carried out, to transmit a PIN input by the user together with an authentication command to the card application 210. The card application 210 checks the user input PIN against the PIN stored in the card application 210 (step S91). If the results of the comparison indicate that the PINs do not match (NO to a step S92), then the card application 210 informs the terminal application 110 that authentication has not been successful (step S94).

On the other hand, if the results of that comparison indicate that the PINs do match (YES to the step S92), then the card application 210 stores the user authentication status in the authentication status information area 214 as authentication completed (i.e., authenticated), after which the card application 210 informs the terminal application 110 that authentication is completed and sends the access information 111 back to the terminal application 110 (step S93).

The access information 111 contains card application identification information indicating for which card application authentication can be deemed to have succeeded by the success of the authentication of the card application 210 (that is, accessible card application), and the card application identification information includes identification information for the card application 220.

It should be noted that the access information 111 may be encrypted using an encryption key where the card application 210 holds the encryption key. Moreover, electronic signature data using an encryption key may be generated and the electronic signature data added to the access information 111.

Figure 13:
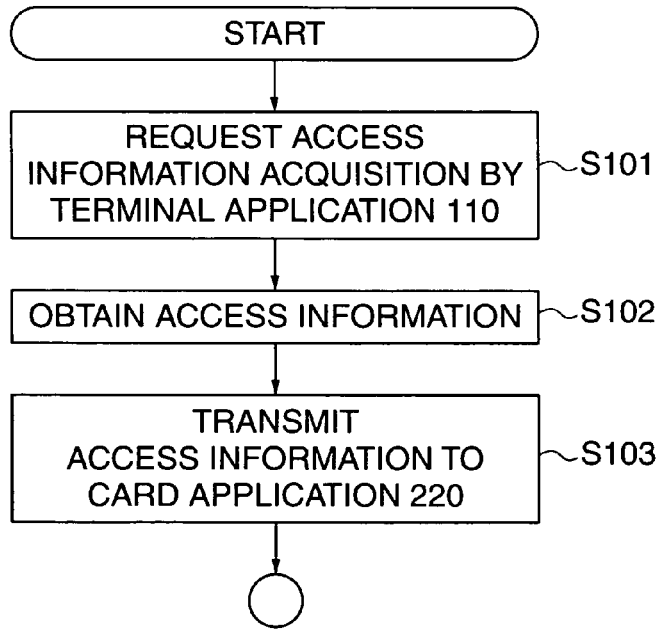
FIG. 13 is a flow chart showing the procedure of a process executed by a terminal application 120 of the authentication system in FIG. 6.
Figure 14:
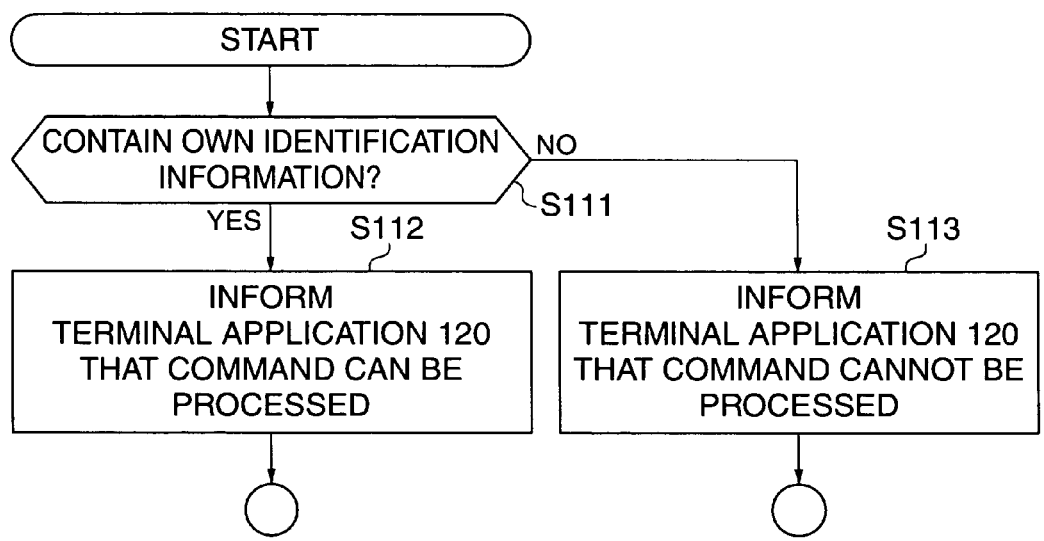
FIG. 14 is a flow chart showing the procedure of a process executed by a card application 220 of the authentication system in FIG. 6.

FIG. 13 is a flow chart showing the procedure of a command execution process executed by the terminal application 120 of the authentication system 1'.

As shown in FIG. 13, first, when the user uses the terminal application 120, the terminal application 120, after receiving a user command execution request from the input device 300 but before transmitting the command to the card application 220, makes a request to the terminal application 110 through a predetermined interface with the terminal application 110 that the terminal application 110 obtain the access information 111 (step S101). If at this time the terminal application 110 has not yet obtained the access information 111, the terminal application 110 prompts the user to input a PIN as in the first embodiment, and carries out authentication for the card application 210 using the input PIN.

The terminal application 120, when it obtains the access information 111 from the terminal application 110 (step S102), transmits the access information 111 to the card application 220 (step S103).

Upon receipt of the access information 111 from the terminal application 110, the card application 220 refers to the access information 111 and determines whether or not its own identification information is included in the access information 111 (step S111). If the former is not included in the latter, the card application 220 informs the terminal application 120 that a command from the terminal application cannot be processed (step S113), whereas, if the former is included in the latter, the card application 220 informs the terminal application 120 that a command from the terminal application can be processed (step S112).

It should be noted that when the card application 220 refers to the access information 111, if the access information 111 is encrypted, the card application 220 may carry out a process of decrypting the access information 111 may be carried out before referring to the access information 111. Further, where the card application 220 cannot decrypt the access information 111, the card application 220 may request the card application 210, through the predetermined interface with the card application 210, to decrypt the access information 111, after which the card application 220 may obtain the access information 111 decrypted by the card application 210 and refer to the access information 111.

It should be noted that the access information generated in the present embodiment is held as long as the connection between the terminal device 100 and the IC card 200 is maintained, and is erased if that connection is terminated.

As described above, according to the present embodiment, authentication information is stored only in the card application 210, and the card application 220, which does not have the authentication information and the authentication information comparison system, determines whether or not the card application 220 itself can be accessed, based on the access information 111 received from the terminal application 120. Thus, an authentication system using card application that does not depend on the presence of an authentication information comparison system can be provided, whereby it is possible to eliminate the unnecessary process of directly receiving and delivering authentication information by the card application that does not require direct reception of such authentication information.

Moreover, by sharing only the user authentication status between the card applications as described above, the user no longer needs to carry out authentication of the IC card each time the user switches card applications, and further, the use of single authentication information improves security and simplifies authentication information management.

Although in the first and second embodiments described above, an example of a configuration is given in which the terminal device 100 is equipped with two terminal applications 110, 120 and the IC card 200 with two card applications 210, 220, the number of terminal applications and card applications is not limited to two.

Moreover, although in the first and second embodiments described above, an example of a configuration is given in which an input device 300 and an IC card reader 400 are added to the terminal device 100, the present invention is not limited to such a configuration, and alternatively, the input device 300 and the IC card reader 400 may be built into the terminal device 100 so as to form a single integrated configuration.

Furthermore, although in the first and second embodiments described above, the respective authentication status information and access information are erased when the connection between the terminal device 100 and the IC card 200 is not maintained, the present invention is not limited to such a configuration, and alternatively, for example, such information may be erased based on input from the input device 300 by the user.

Moreover, although in the first and second embodiments described above, examples are given of an authentication code, a fingerprint and a voiceprint as authentication information, in addition to and other than these it is also possible to use a palm print or a retinal scan.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2003-430972 filed Dec. 25, 2003, which is hereby incorporated by reference herein.

What is claimed is:

1. An authentication method for an authentication system including an information recording medium storing a plurality of applications, including an authentication application holding authentication information and a plurality of terminal applications associated respectively with the plurality of applications, and at least one terminal device communicable with the information recording medium, the method comprising:
   a comparison step of comparing authentication information inputted by a user and transmitted from the terminal device and the authentication information held by the authentication application, with the authentication application;
   a storage step of storing authentication status information according to results of the comparison, with the authentication application;
   an acquisition step of acquiring the authentication status information from the authentication application, with at least one application other than the authentication application, stored in the information recording medium;
   a notification step of notifying the terminal application associated with the other application stored in the information recording medium that the authentication status information acquired from the authentication application indicates non-authentication when the acquired authentication status indicates the non-authentication; and
   a request step of requesting the terminal application associated with the authentication application to carry out user authentication, with the terminal application associated with the other application, in response to the notification.

2. An authentication method according to claim 1, wherein the authentication application and the other application establish a trust relationship therebetween by recognizing identification information for the other.

3. An authentication method according to claim 1, wherein the authentication application and the other application establish a trust relationship therebetween by carrying out authentication of each other using an encryption key held by each.

4. An authentication method according to claim 1, further comprising:
   a transmission step of transmitting access information relating to at least one accessible application stored in the information recording medium to the terminal application associated with the authentication application, based on the authentication status information, with the authentication application;
   a second storage step of storing the transmitted access information with the terminal application associated with the authentication application; and
   a delivery step of delivering the access information from the terminal application associated with the authentication application to the terminal application associated with the other application stored in the information recording medium when the terminal application associated with the other application is accessible.

5. An authentication method according to claim 4, further comprising:
   a second transmission step of transmitting the delivered access information from the terminal application associated with the other application stored in the information recording medium to the other application, before access to the other application stored in the information recording medium is carried out; and
   a determination step of determining, with the other application stored in the information recording medium, whether access to itself can be carried out, based on the access information.

6. An authentication method according to claim 4, wherein the access information is erased when a connection between the information recording medium and the terminal device becomes terminated.

7. An authentication method according to claim 1, further comprising:
   an encryption step of encrypting, using an encryption key, access information relating to at least one accessible application stored in the information recording medium to the terminal application associated with the authentication application, based on the authentication status information, with the authentication application; and a decryption step of decrypting the encrypted access information in response to a request from the other application stored in the information recording medium.

8. An authentication method according to claim 1, wherein the authentication status information is erased when a connection between the information recording medium and the terminal device becomes terminated.

9. A storage medium storing a program for causing a computer to execute an authentication method for an authentication system including an information recording medium storing a plurality of applications, including an authentication application holding authentication information and a plurality of terminal applications associated respectively with the plurality of applications, and at least one terminal device that can communicate with the information recording medium, the program comprising:

a comparison module for comparing authentication information inputted by a user and transmitted from the terminal device and the authentication information held by the authentication application, with the authentication application;

a storage module for storing authentication status information according to results of the comparison, with the authentication application;

an acquisition module for acquiring the authentication status information from the authentication application, with at least one application other than the authentication application, stored in the information recording medium;

a notification module for notifying the terminal application associated with the other application stored in the information recording medium that the authentication status information acquired from the authentication application indicates non-authentication when the acquired authentication status indicates the non-authentication; and a request module for requesting the terminal application associated with the authentication application to carry out user authentication, with the terminal application associated with the other application, in response to the notification.

* * * * *